(12) United States Patent
Gaw (10) Patent No.: US 7,721,633 B2
(45) Date of Patent: May 25, 2010

(54) DUAL BEVEL TABLE AND SLIDE MITER SAW

(76) Inventor: Stanley E. Gaw, 124 Berwick Pl., Lansdale, PA (US) 19446

( * ) Notice: Subject to any disclaimer, the term of this patent is extended or adjusted under 35 U.S.C. 154(b) by 253 days.

(21) Appl. No.: 11/552,357

(22) Filed: Oct. 24, 2006

(65) Prior Publication Data

US 2008/0092709 A1   Apr. 24, 2008

(51) Int. Cl.
*B27B 5/00* (2006.01)
(52) U.S. Cl. .............. 83/471.3; 83/473; 83/581
(58) Field of Classification Search .......... 83/471.3, 83/473, 477.1, 477.2, 581, 582
See application file for complete search history.

(56) References Cited

U.S. PATENT DOCUMENTS

| | | | |
|---|---|---|---|
| 1,635,290 A * | 7/1927 | Skoglund | ............ 83/486.1 |
| 3,344,819 A | 10/1967 | Mitchell | |
| 5,357,834 A | 10/1994 | Ito et al. | |
| 5,720,213 A | 2/1998 | Sberveglieri | |
| 5,819,625 A | 10/1998 | Sberveglieri | |
| 6,530,303 B1 * | 3/2003 | Parks et al. | ............ 83/473 |
| 6,591,725 B1 | 7/2003 | Martin | |
| 6,739,230 B2 | 5/2004 | Chang | |

* cited by examiner

*Primary Examiner*—Boyer D Ashley
*Assistant Examiner*—Omar Flores-Sánchez (57) ABSTRACT

A portable, double bevel, combination table saw and slide miter saw comprising a horizontally disposed working platform with an elongated slot, is supported by a frame. A saw assembly is pivotably mounted beneath the working platform, with a saw blade that protrudes through the slot to cut a workpiece on the platform whereby stationary workpiece operations as well as moving workpiece operations may be executed. The stationary workpiece operations are executed from one side of the platform, and moving workpiece operations are executed from the opposite side of the platform, with separate appropriate controls on each side. The possibility of interference between saw assembly parts and the underside of the work platform inherent in double bevel configurations is avoided by the self-adjustment of the maximum depth for the workpiece bevel cuts.

7 Claims, 8 Drawing Sheets

DUAL BEVEL TABLE AND SLIDE MITER SAW

FIELD OF THE INVENTION

The present invention relates to a portable combination table saw. More specifically, it relates to a table saw wherein moving workpiece cutting, stationary workpiece cutting, and double beveling capabilities are provided in one device.

BACKGROUND OF THE INVENTION

For transportable personal or contractor use, there has been a steady progression of designs of bench saws. For moving work pieces, these range from simple single position saw blade table saws to beveling and depth cut adjustable table saws. The operational advantage of having stationary workpiece cross cutting was recognized early in design of bench saws, with the ensuing design of swinging saws and sliding saws having motors either above or below the work platform. Comprehensive designs such as radial arm saws and above the work platform slide miter saws have found recent popularity.

Another portable saw design is a saw that achieves long moving workpiece rip cutting, and also provides stationary workpiece cutting. Radial arm saws provide both functions, and have been commercially successful; however, their size and weight make them non transportable, and their rip cut widths are limited. To complete the package of functions, some recent saw designs have, for either above or below work platform saw motor applications, included double bevel cutting. Examples of these designs include U.S. Pat. No. 5,357,834 issued to Ito et al. entitled "Miter Saw"; U.S. Pat. No. 5,720,213 issued to Sberveglieri entitled "Bevel Table Saw Adjustment"; and U.S. Pat. No. 6,591,725 issued to Martin entitled "Circular Sawing Machine." However, the prior art has not developed a table saw with slide miter cutting capabilities that is competitive with the prior art above platform slide miter saws Further, the manual control of prior art table saw slide cutting, is not compatible with operator accustomed procedures.

SUMMARY OF THE INVENTION

In order to overcome the deficiencies in the prior art, the present portable, double bevel, combination table and slide miter saw has been devised. It is the purpose of this invention to improve the cutting capabilities of known prior art double bevel table saws with the convenience of slide miter saws, and to be economically competitive. As will be more fully described herein, the present saw comprises a horizontally disposed working platform with an elongated blade slot supported by a frame, and a saw assembly pivotally mounted beneath the working platform with a saw blade that protrudes through the slot to cut a workpiece on the platform. Stationary workpiece operations as well as moving workpiece operations may be executed. The stationary workpiece operations are executed from one side of the platform, and moving workpiece operations are executed from the opposite side of the platform. Separate controls are provided on each side of the saw for the corresponding function.

More specifically, this design provides a generally horizontally disposed platform having a working surface, an underside, a saw blade slot, first and second opposing platform sides at opposite ends of the slot, and a blade slot axis. A frame supporting the platform has a first side and a second side corresponding to the first and second sides of the platform, and includes an arcuate gear rack mounted along the inside, near the bottom of each of the frame sides, the racks having a radially varying curvature. A cradle assembly is pivotally supported by the frame substantially about the slot axis, the cradle having first and second sides corresponding to the first and second sides of the frame. The cradle has two clamping mechanisms in selective engagement with the frame for releasably locking the cradle to the frame at selected pivotal positions of the cradle. A carriage is mounted on the cradle framework, and includes a mechanism for providing the slidable movement of the carriage in a horizontal direction parallel to the blade slot axis. A saw assembly is mounted on the carriage, and comprises a saw motor to which a circular saw blade is attached.

Two telescoping guide assemblies are mounted on the frame, in line with the blade slot, one each on the first and second sides, and engage the cradle for radial alignment thereof.

Two pinion gears are mounted on the cradle framework, one on each side. The pinion gears are in meshing relation with the arcuate gear racks on the frame for supporting the cradle assembly, for controlling the pivotal movement of the cradle assembly, and for automatically adjusting the saw blade exposure above the platform as the cradle assembly pivots. The pinion gears are arranged in a coaxially aligned opposing pair on opposite ends of a through shaft, rotatable in unison by hand cranks, one on each of the first and second sides of the frame. Hand-cranking the gear pair in unison by using either crank, the position of the cradle, and hence the bevel angle of the saw blade, can be manually adjusted.

The saw assembly is pivotally mounted to the carriage on side-suspended axles that permit movement of the motor assembly about an axis parallel to the axis of the saw blade; whereby, the saw blade is moved from a non-cutting position below the platform to cutting positions above the platform. A control arm is connected to the carriage for rotating and for moving horizontally the saw assembly. The control arm is connected to the saw assembly by a linkage such that the downward movement of the control arm causes the upward motion of the saw blade and the forward and backward movement causes the forward and backward motion of the saw blade. A control handle is attached to the end of the control arm whereby the full range of motion of the saw blade is controlled by the upward, downward, backward, and forward manual movement of the handle. A saw assembly positioning mechanism independent of the control arm, is mounted on the carriage; whereby, the vertical position of the saw blade with respect to the platform may be fixed at selected heights. Means at the second side of the frame are included for operating the saw assembly positioning mechanism.

Accordingly, it is the object of the present invention to provide a portable table saw that supports dual beveling, stationary workpiece cutting, and moving workpiece cutting.

It is further an object of this invention to provide better stationary cutting performance than known prior art slide miter saws. To this end, a cutting envelope is provided that maximizes performance for the applied hardware dimensions.

It is stiff further an object of this invention to provide a stationary workpiece cutting action that is directed away from the operator as is provided by the popular prior art over-platform slide miters. This cutting action is also to provide a cut initiation point that is located at the platform surface, conveniently visible to the operator, and that normally coincides with a standard workpiece marking edge. This provides the convenience of a laser line without the added cost.

It is yet further an object of this invention to provide stationary workpiece operation from the first side of the platform, and to provide moving workpiece operation from the second side of the platform, with full and separate controls for each operation on its associated side.

It is further an object of this invention to provide a bevel locking means that simultaneously locks two points, one at each first and second sides of the cradle, to the frame, to maintain a more rigid configuration.

From the following drawings and description of the preferred embodiment, it will be appreciated by those of skill in the art that the objects of the invention have been achieved. While the present invention will be described with the reference to a specific embodiment, the following description is illustrative of the invention and is not to be construed as limiting the invention. Various modifications to the present invention can be made to the preferred embodiment by those skilled in the art without departing from the true spirit and scope of the invention. It will be noted here that for better understanding, like components are designated by the same reference numerals throughout the various figures of drawing which follow.

DESCRIPTION OF THE PREFERRED EMBODIMENT

Figure 1:
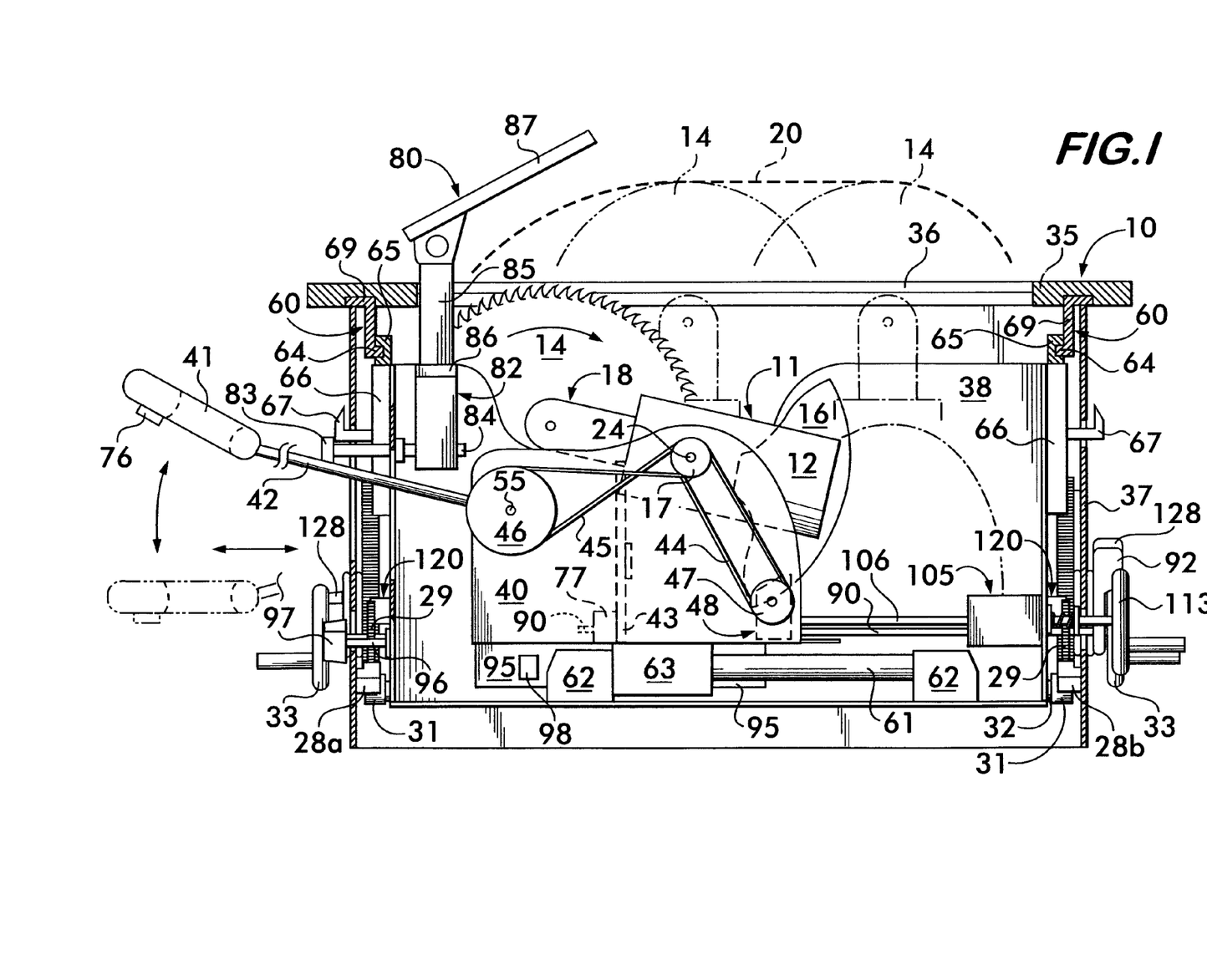
FIG. 1 is a side elevation view partially cut away, with saw blade positions shown in phantom.
Figure 5:
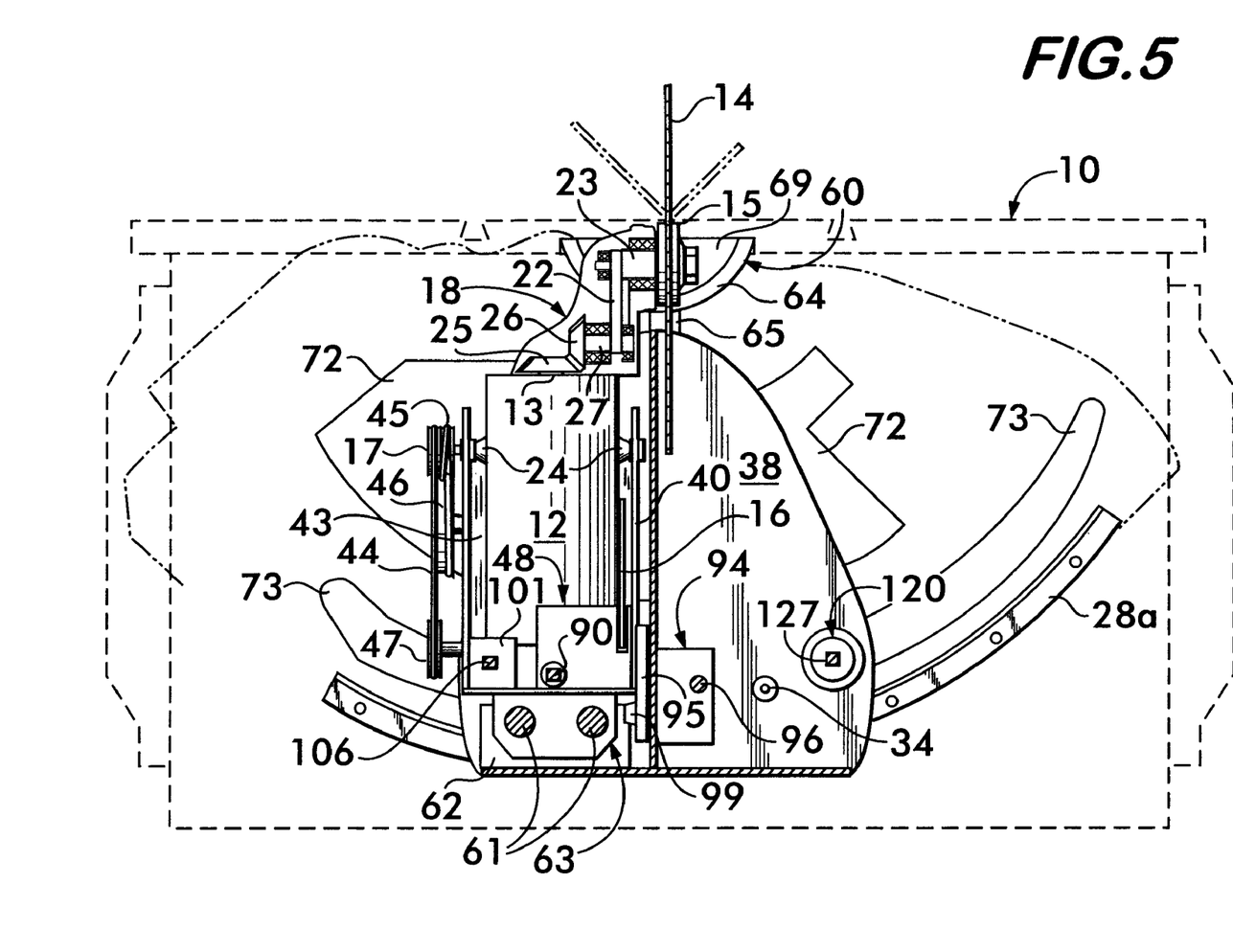
FIG. 5 is a table mode side elevation view partially cut away with the pivotal hardware and saw blade maximum positions shown in phantom.

With reference to the drawings, in which common components have been numbered the same, FIG. 1 illustrates in one embodiment, a double bevel combination table saw and slide miter saw 10, comprising a frame 37, and having a working platform 35 in which is formed a saw slot 36. The saw may be operated as a slide miter saw from a first side of the platform 35 (the left side of this figure), herein referred to as "the miter mode side", or operated as a conventional table saw from the opposing side of the platform 35 (the right side of this figure), herein referred to as "the table mode side". These opposing sides are at opposite ends of the slot 36. Referring to FIG. 5, a pivot axis 15 for the bevel action of this invention, is established as a line substantially on the surface of platform 35 and coincident with the longitudinal center line of slot 36.

Figure 2:
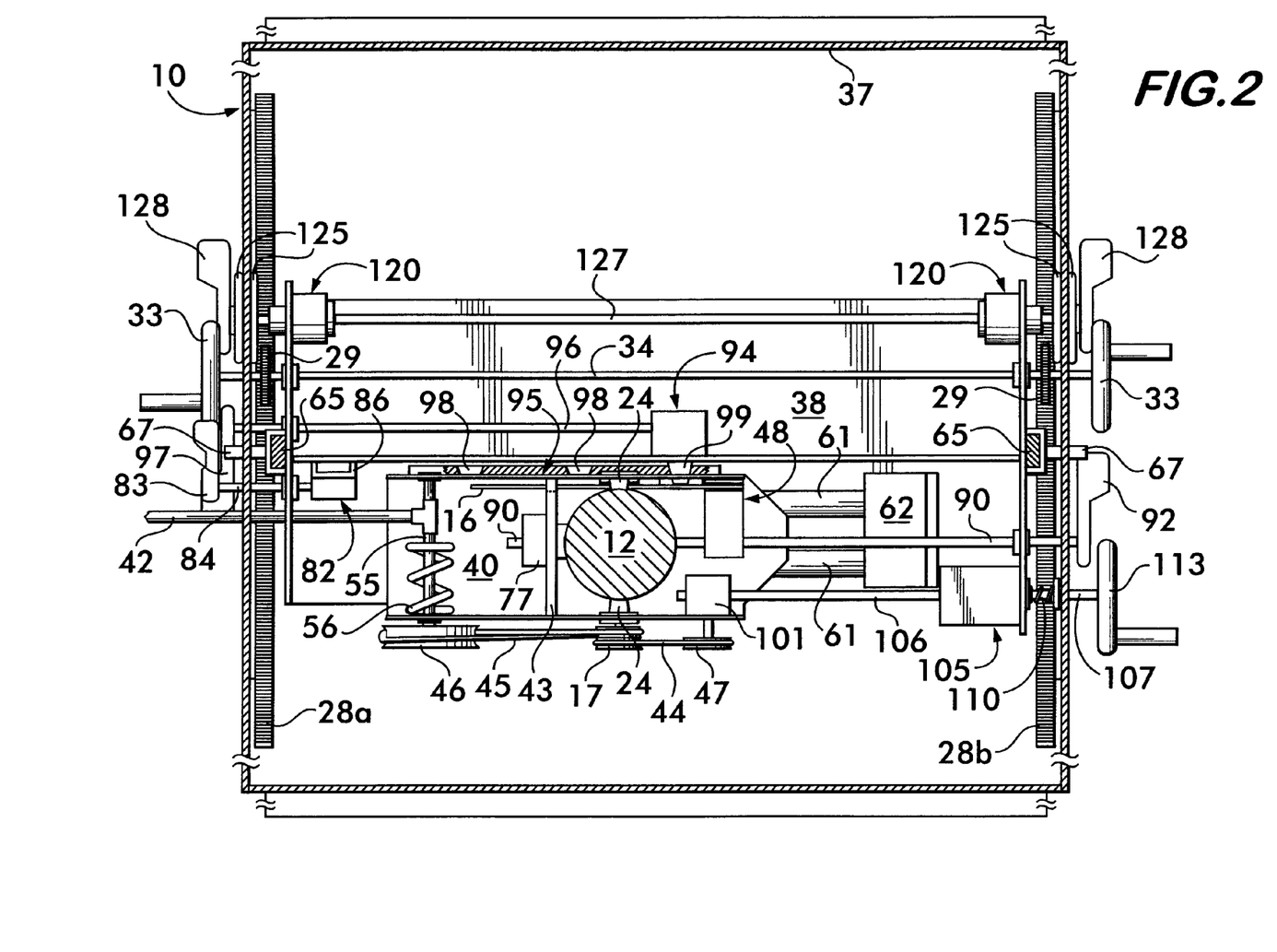
FIG. 2 is a top plan view partially cut away.
Figure 3:
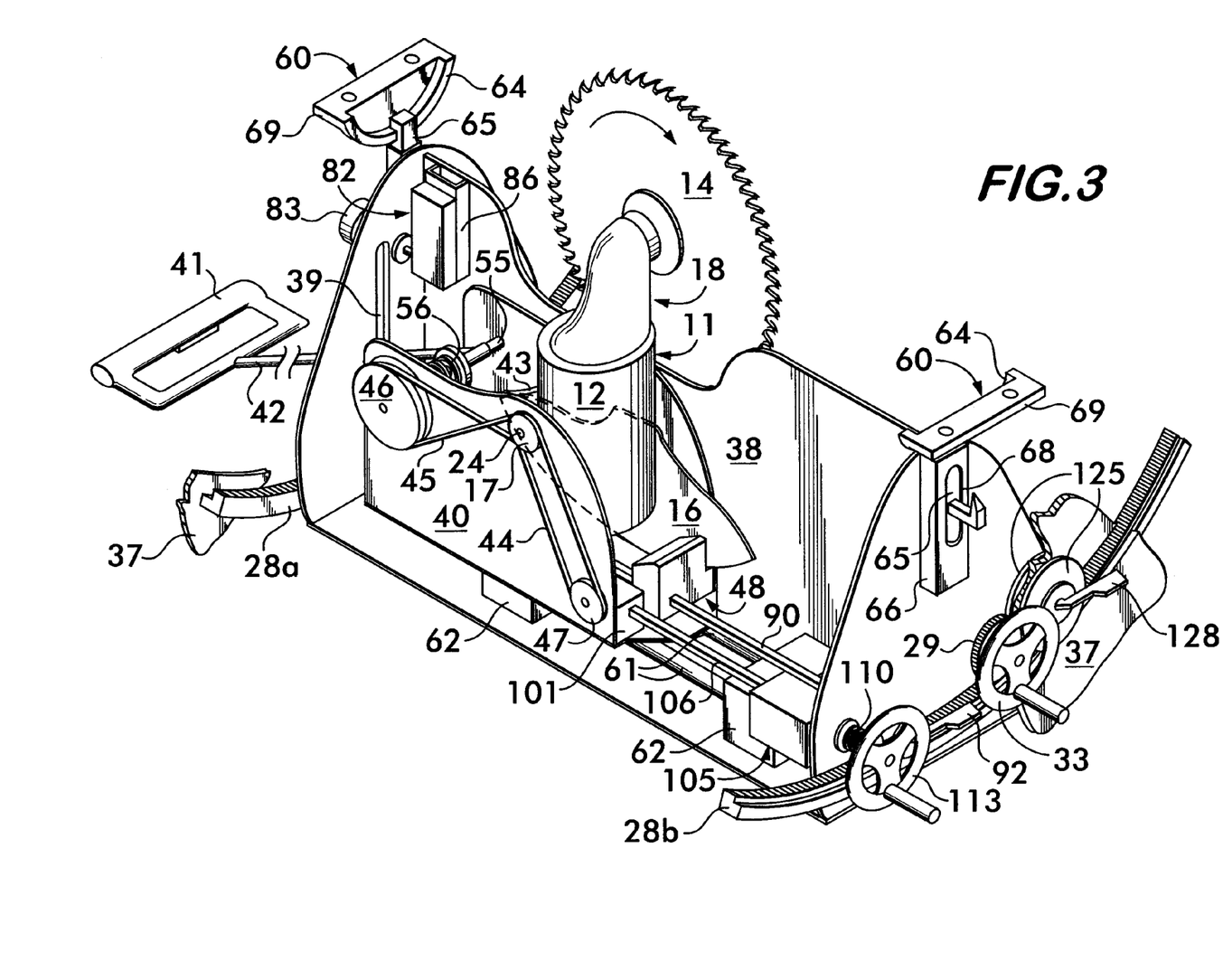
FIG. 3 is an isometric view with the platform and frame removed.

Referring to FIGS. 1, 2, and 3, a supporting cradle 38, disposed beneath platform 35, is the framework on which a saw assembly 11 is pivoted about axis 15. The cradle 38 is supported by the frame 37 through a rack and pinion means as described below. Two radial alignment guide assemblies 60, each comprising a half-round bracket 69 and a guide bar 65, are disposed beneath the platform 35. At each end of slot 36, a bracket 69 is mounted on the top of frame 37, and each bracket 69 has a half round track 64 with a center of curvature on axis 15. Guide bars 65 slidably engage each track 64 for arcuate movement thereon. A guide sheath 66 is fixedly attached to each opposing end of cradle 38, and further; the distal end or each bar 65 linearly slidably engages a respective sheath 66. The guide assemblies 60 are in a telescoping relation with, and maintain the pivotal disposition of, cradle 38. Cradle 38 is supported during pivotal adjustments by the frame 37, by a rack and pinion means, and by bars 65. Referring to FIG. 2, a bevel adjustment through shaft 34, parallel to the pivot axis 15, is rotatably connected to cradle 38 substantially near its base, and a bevel pinion 29 is fixedly attached near each end of shaft 34, wherein pinions 29 reside between cradle 38 and frame 37. On the lower portion of frame 37, a support rack 28a is fixedly attached to the inside of the miter mode side, and a support rack 28b is fixedly attached to the inside of the table mode side. Racks 28a and 28b have substantially square cross sections, have geared upper sides, and have smooth under sides. The pinions 29 engage the upper sides of racks 28a and 28b. Referring to FIG. 1, a containment roller 31 is disposed on the underside of each rack 28a and 28b, directly opposing each pinion 29, and each roller 31 is rotatably supported by a roller axle 32 fixedly attached to cradle 38. Axles 32 are parallel to shaft 34. Each roller 31 is disposed at a distance from its respective pinion 29, that insures meshing contact is maintained for each gear 29 and its corresponding rack 28a or rack 28b. Shaft 34 extends outside frame 37 through a control traveler slot 73 on the miter mode side, and through a control traveler slot 71 on the table mode side. A bevel adjustment crank wheel 33 is fixedly attached to each end of shaft 34. Rotating either wheel 33 forces pinions 29 to progress on respective racks 28a and 28b, and thus the pivotal position of cradle 38 is adjusted. Racks 28a and 28b are symmetrical and of a design established, irregular configuration, thus adjusting the radial dimension of the pivotal path of cradle 38, relative to the axis 15, automatically according to the bevel angle.

Figure 7A:
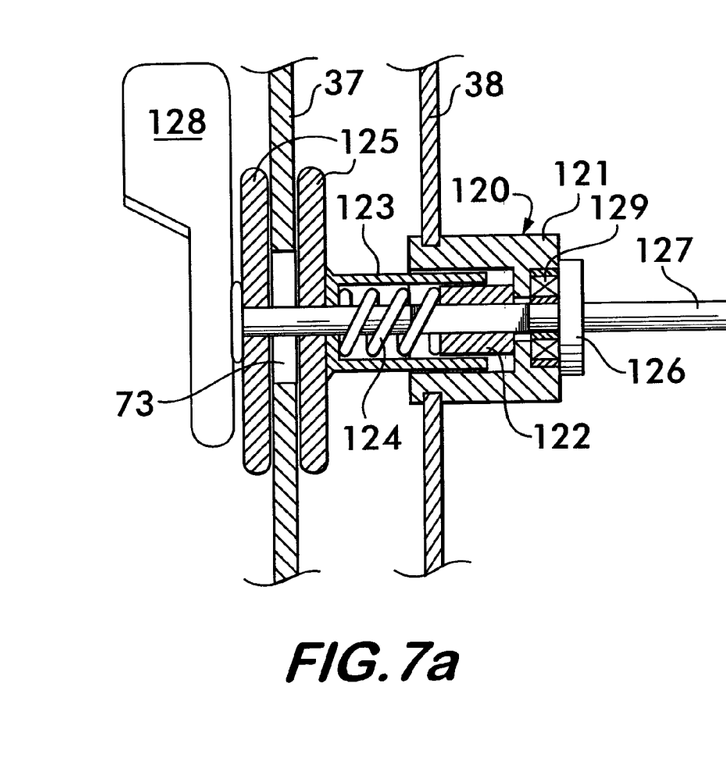
FIG. 7a is a top plan enlarged sectional view showing the bevel position locking mechanism in the unlocked state.
Figure 7B:
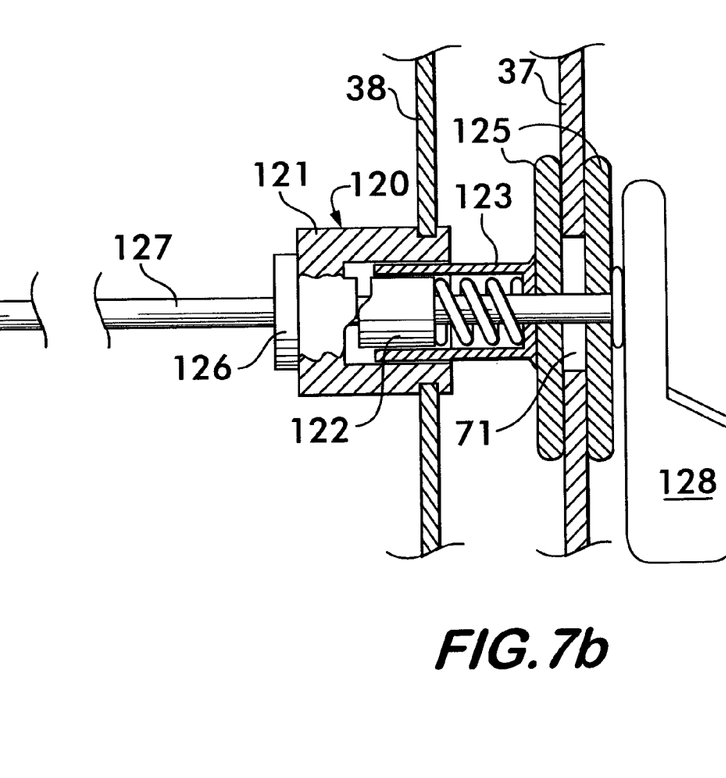
FIG. 7b is a top plan enlarged sectional view showing the bevel position locking mechanism in the locked state.

Once the cradle 38 has been located at a desired bevel angle, two bevel position locking mechanisms 120, shown in FIG. 2, one at each end of cradle 38, are employed to lock cradle 38 in position. Mechanism 120, as shown in greater detail in FIGS. 7a and 7b, comprises a clamp housing 121 fixedly connected to cradle 38; a bevel lock through shaft 127 rotatably and slidably connected to housing 121 by a shaft bearing 129; a pressure ring 126 fixedly attached to shaft 127 and adjacent to housing 121, a cylindrical cam block 122 coaxial with, slidably attached to, and rotatably engaging shaft 127; a cylindrical clamping piston 123 coaxial with and slidably and rotatably attached to shaft 127; and a compression spring 124 coaxial with shaft 127 and positioned between block 122 and piston 123. Shaft 127 extends outside the frame 37, through slot 73 on the miter mode side, and through slot 71 on the table mode side. A clamp washer 125, coaxial with shaft 127, is placed on each side of frame 37 near each end of shaft 127. A bevel lock handle 128 is fixedly attached to each end of shaft 127. Handles 128 having a lock position and a release position. For at least the distance of slidable attachment of block 122 on shaft 127, shaft 127 has a square cross section. Shaft 127 slidably engaging a square shaft along the axis of cylindrical block 122, such that block 122 turns in unison with shaft 127. The junctions of blocks 122 and housings 121 provide a common cam action, such that turning either handle 128 from its release position to its lock position, forces each block 122 toward frame 37. The action of block 122 toward frame 37 is transferred through spring 124 forcing cylindrical piston 123 against a washer 125. The spacing of handle 128, washers 125, and frame 37 are such that washers 125 compress against frame 37, providing locking of cradle 38 to frame 37, and thus locking the saw assembly 11 in a selected bevel position. Springs 124 provide stable locking states in a common manner. Rings 126 direct the counterforce of the locking pressure exerted by pistons 123 to shaft 127.

Referring to FIGS. 1, 2 and 3 of the accompanying drawings, the saw assembly 11, comprising a circular saw blade 14 attached to a saw motor 12, is rotatably mounted on a motor support carriage 40, which in turn is slidably mounted on two slide bars 61 secured to cradle 38 by two bar supports 62. The slidable mounting of carriage 40 is accomplished by a bearing assembly 63, fixedly attached to carriage 40 and traveling on bars 61. The saw motor 12 is rotatably mounted on carriage 40 by a two sectioned motor support axle 24 affixed to the sidewalls of the carriage 40. Stops, not described herein, on a carriage brace 43 provide for limiting rotation of motor 12 in either direction. Referring to FIG. 5, the saw assembly 11 as shown in greater detail, comprises saw motor 12, a saw blade axle 23 supporting the circular saw blade 14, and a drive transmission mechanism 18 for transferring drive from motor 12 to saw blade 14. Mechanism 18 comprises a beveled gear 25 driven by a motor drive shaft 13, and a beveled gear 26 on a lay shaft 27, driven by gear 25; further, a belt 22 mounted on shaft 27 drives axle 23 and subsequently blade 14. This version of mechanism 18 is for demonstration purposes, and mechanism 18 could be configured, within the scope of this invention, in a variety of ways to maintain a minimal profile as required for double beveling. The rotation of motor 12 about axle 24, permits blade 14 to travel between a recessed position, slightly beneath the surface of platform 35, and a position for maximum cut depth above platform 35.

As described earlier, the pivotal path of cradle 38 is automatically adjusted according to the bevel angle. This in turn determines the available exposure of saw blade 14 according to the bevel angle. With reference to FIG. 5, noting the phantom displacement lines, if the cradle 38 is swung in a circular path, 45 degrees to the right with saw blade 14 at its maximum exposure, there is sufficient space below the platform 35 for the saw assembly 11 and other parts of the pivoting apparatus to be accommodated without clashing with the platform 35. However, swinging the cradle 38 in a circular path 45 degrees to the left with the saw blade 14 at its maximum exposure, would force portions of the saw assembly 11 to clash with the underside of the platform 35. Hence the configuration of racks 28a and 28b is chosen such that the automatic adjustment of the cradle 38 radial disposition, avoids clashes between saw assembly 11 and platform 35 over the entire bevel range.

Figure 4:
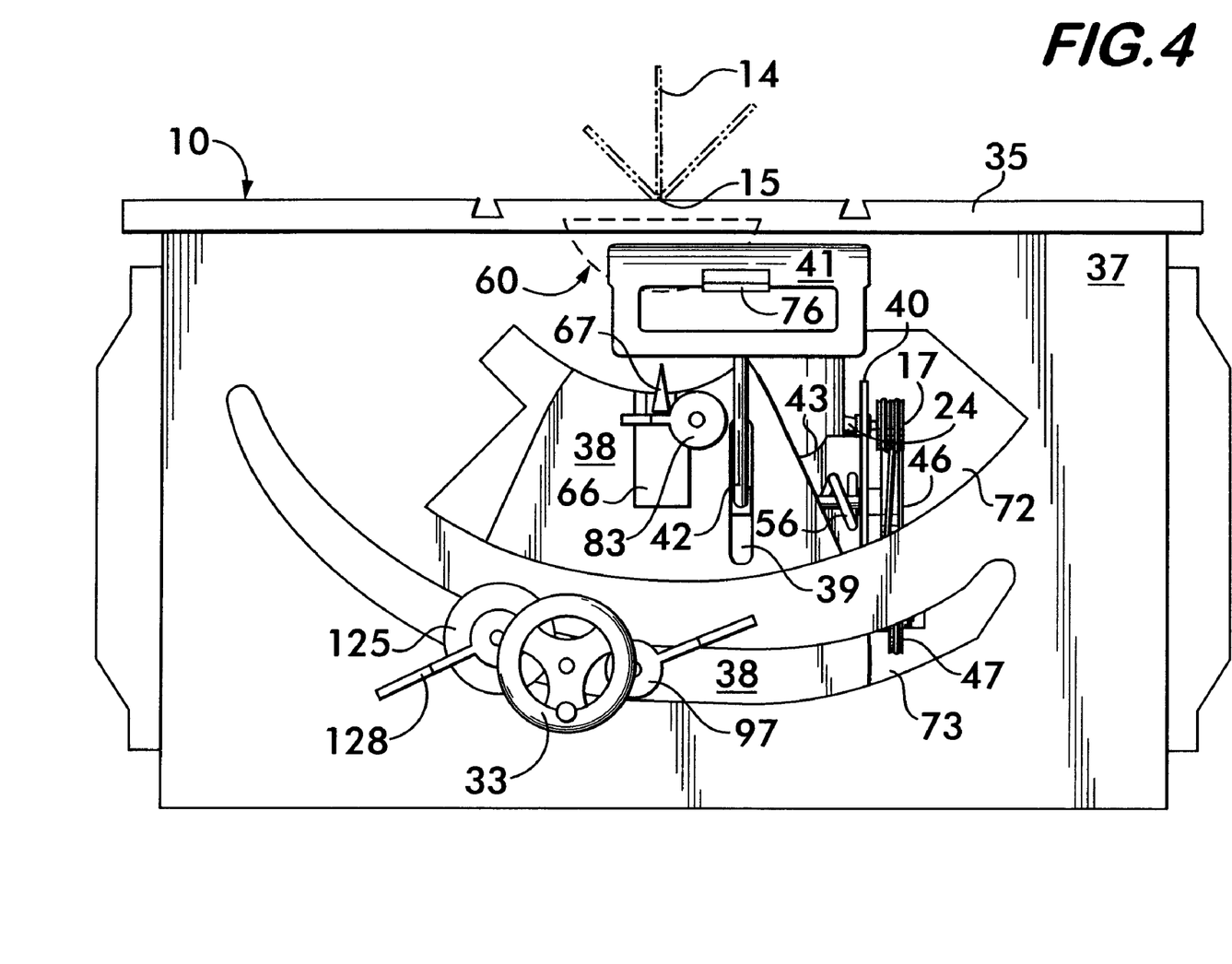
FIG. 4 is a miter mode side view with alternate saw blade bevel positions shown in phantom.

Referring now to FIGS. 2, 4 and 5, carriage 40 horizontal position locking is provided for transporting or storage, table mode operation, or miter mode operation when it is desirable to perform non sliding chop cuts. The locking is released for miter mode slide cutting operations. Operating the saw in the table mode where the work piece is moved through the blade, involves a horizontally fixed saw assembly 11; therefore, before entering this mode, saw assembly 11 is locked in a selected horizontal position by means of a latch control handle 97. A transverse latch mechanism 94 provides the means to releasably lock the carriage 40 at a plurality of selected positions along the bars 61. The mechanism 94 includes a traverse latch plate 95 having a plurality of receptor openings 98, and is fixedly attached to carriage 40. Mechanism 94, of common latch bolt construction and fixedly connected to the cradle 38, being controlled by a traverse latch shaft 96. Referring to FIG. 2, shaft 96 is rotatably supported by cradle 38, and extends outside the frame 37 through traveler slot 73. Control handle 97, having a latch position and a release position, is fixedly attached to the distal end of shaft 96 on the miter mode side of the frame 37. Employing handle 97, a latch bolt 99, of the mechanism 94, may be directed into a selected opening 98. When bolt 99 engages an opening 98, carriage 40 is locked relative to cradle 38.

Referring to FIGS. 1 through 4, a miter mode control handle 41 provides a first means for cut depth adjustment used exclusively for the miter mode. A control axle 55 is rotatably connected to carriage 40, and a handle arm 42 is fixedly connected to axle 55. Arm 42 extends through an arm traveler slot 39 in cradle 38, and outside frame 37 through a control traveler slot 72. Handle 41 is fixedly connected to the distal end of arm 42. Axle 55 is further fixedly connected to a miter mode control pulley 46. Still further, pulley 46 is linked to a saw assembly pulley 17 by a miter mode control cable 45, and pulley 17 is fixedly attached to axle 24. The linkage is such, that the action of depressing handle 41 from its rest position through the full extent of its vertical freedom, moves saw blade 14 from its recessed position to its maximum cut depth position. A helical bias spring 56, coaxial with axle 55, affixed to axle 55 and carriage 40, maintains a bias on motor 12, through connecting linkages, that returns saw blade 14 to its recessed position when handle 41 is released. Handle 41 is further employed to move saw blade 14 the extent of its horizontal range. This horizontal movement being accomplished by urging handle 41 toward and away from frame 37. A momentary power switch 76 is mounted in handle 41 for miter mode power control of motor 12.

A maximum cutting envelope 20 for miter mode operations, indicated by dashed lines in FIG. 1, is generated by depressing handle 41 when in its extended position, its full range, then urging it through its full horizontal extent.

Figure 8:
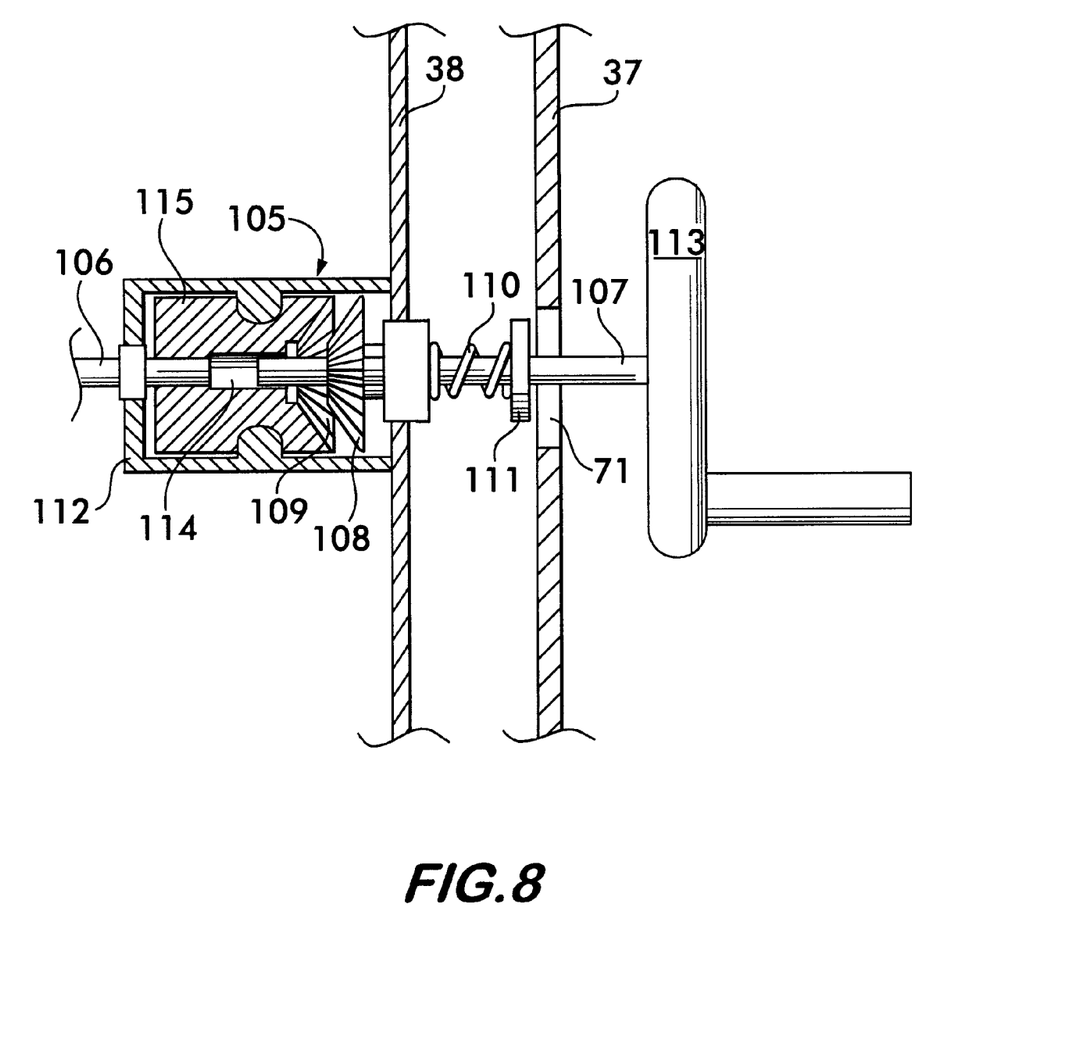
FIG. 8 is a top plan partially sectioned view of the control wheel disengagement mechanism.

Referring now to FIGS. 1, 2, 3 and 6, a cut depth control crank wheel 113 provides a second means for cut depth adjustment and is used exclusively for the table mode. Wheel 113, as described below, is rotatably linked to pulley 17 only when wheel 113 is urged toward frame 37. Motor 12 rotation is controlled by rotating wheel 113, moving saw blade 13 between its recessed position and its maximum cut depth position. Because the cut depth control is also affected by another linkage at the miter side of the frame, it is necessary that the wheel 113 linkage be operatively disconnectable. This disconnect being accomplished through the action of a control wheel disengagement mechanism 105. Referring now to FIG. 8, means for providing the disengagement of this linkage are shown in detail. Wheel 113 is fixedly connected, outside frame 37, to one end of an engagement shaft 107. Shaft 107, extending through slot 71, is rotatably and slidably connected to mechanism 105. Mechanism 105 is fixedly connected to cradle 38, and comprises a disconnect housing 112, an engagement gear 108, and a geared block 115. A cut depth control shaft 106, coaxial with shaft 107, and on the opposing side of housing 112, is rotatably attached to housing 112. Block 115 is rotatably connected to housing 112, and is coaxial with shaft 106 and shaft 107. Shaft 106 is fixedly attached to block 115, and shaft 107 slidably and rotatably attaches to block 115 through a cylindrical guide 114. A compression ring 111 is fixedly attached to shaft 107, and a release bias spring 110 coaxial with shaft 107, is disposed between ring 111 and cradle 38, such that spring 110 maintains a bias, away from cradle 38, on shaft 107. Engagement gear 108 is fixedly attached to shaft 107. Block 115 has a receptor gear 109, such that when shaft 107 is urged toward cradle 38 using wheel 113, gear 108 engages gear 109, and wheel 113 is releasably linked to shaft 106. The rotary motion of shaft 106 is transferred to a table mode control pulley 47 through a direction transmission 101. Transmission 101 being of commonly known construction. Pulley 47 is linked to pulley 17 by a table mode control cable 44. The connection of shaft 106, shaft 106 having a square cross section, to transmission 101 is longitudinally slidable and rotationally engaging. When the pressure toward cradle 38 on wheel 113 is removed, the bias of spring 110 disengages gear 108 from gear 109.

Referring to FIGS. 2 and 3, when the motor 12 is adjusted by wheel 113 to provide the desired cutting depth, the motor 12 can be locked in place using a cut depth lock handle 92. The locking means comprises a disk segment 16 fixedly attached to motor 12, and a caliper locking mechanism 48, of common construction, fixedly attached to carriage 40, through which disc segment 16 passes. A cut depth lock shaft 90 with a square cross section, connects to handle 92 at one end outside frame 37, extends through slot 71, and is rotatably supported by cradle 38. Further, shaft 90 longitudinally slidably attaches to and rotatably engages, the caliper locking mechanism 48. Mechanism 48, of well know cam design and under the control of shaft 90, either clamps or releases disk segment 16. This locks or permits respectively, the rotary motion of motor 12. Thus in table mode, the cut depth position of saw blade 13 is either locked at a selected point, or the cut depth position is free to be adjusted. The saw blade 14 would normally be locked in the retracted position for transporting.

Figure 6:
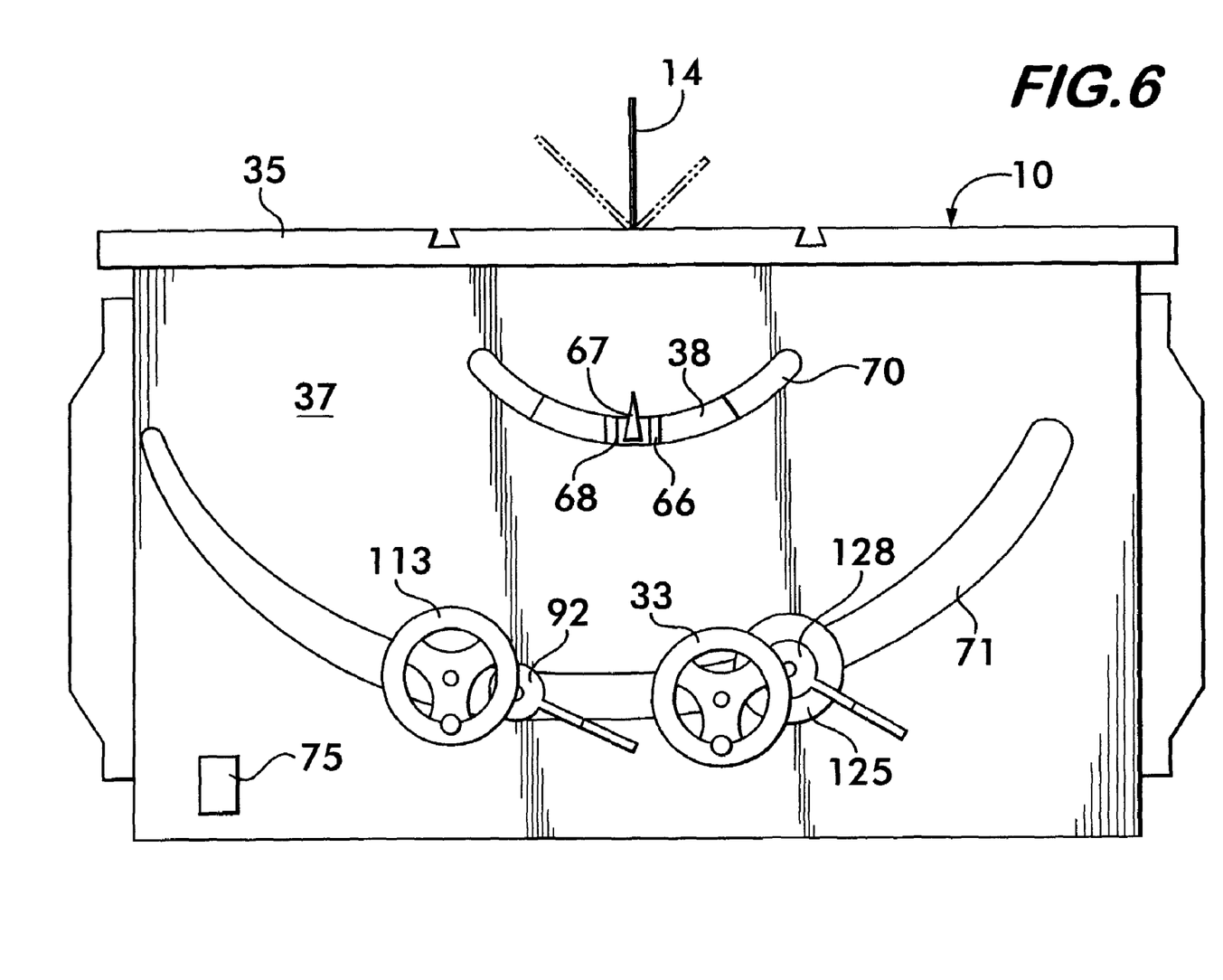
FIG. 6 is a table mode side view with the maximum saw blade pivot bevel positions shown in phantom.

Referring to FIGS. 1 and 6, power to motor 12 for the miter mode is turner on and off by a momentary switch 76 on handle 41, and for the table mode, is turned on and off by a toggle power switch 75 on the table mode side of frame 37. The lock shaft 90 extends towards the miter mode side at least through a power selection switch 77. Shaft 90 engages switch 77 rotatably, and is longitudinally slidably attached thereto. Switch 77 is of a configuration, not shown herein, such that when cut depth lock handle 92 is in the lock position and the saw blade 13 is locked in position for table mode cutting, switch 75 is enabled and switch 76 is disabled. Further, when cut depth lock handle 92 is in the release position and the saw blade 14 may be freely located for miter mode cutting, switch 76 is enabled and switch 75 is disabled.

Referring to FIGS. 1 and 3, to compliment circular protractor paths, two bevel indicators 67, one at each operating side, are attached to guide bars 65, and each protrudes through an indicator traveler slot 68 in its respective sheath 66. Further, miter mode indicator 67 extends through slot 72, and table mode indicator 67 extends through a protractor traveler slot 70.

Referring to FIG. 1, a miter mode dust guard assembly 80 is supported by a guard support sheath 86 fixedly attached to cradle 38. The assembly 80 comprises a miter dust guard 87 and a guard support shaft 85. Guard 87 is rotatably attached to shaft 85. Shaft 85 fits through slot 36, and slips into sheath 86. A guard lock mechanism 82 fixedly attached to sheath 86, locks shaft 85 in sheath 86, and is of common construction. A guard lock shaft 84 is rotatably attached to mechanism 82, rotatably supported by cradle 38, and extends outside frame 37 through slot 72. A guard lock handle 83 is fixedly attached to the distal end of shaft 84. Handle 83 has a lock position and a release position to respectively lock and release shaft 85 in sheath 86.

A common table saw dust guard assembly for table mode operation, not included in the description, would be attached in the same manner as the miter mode dust guard assembly 80.

It should be understood that there may be modifications and changes to the present invention that will be obvious from the foregoing description to those skilled in the art; however, the present invention should be limited only by the following claims and their legal equivalents.

What is claimed is:

1. A double bevel table saw comprising:
    a. a generally horizontally disposed platform having a working surface, an underside, a saw slot, a saw slot axis, and a first side and a second side of said platform at opposite ends of said slot;
    b. a frame supporting said platform, having a first side and a second side corresponding to said first side and said second side of said platform;
    c. a support rack gear, being noncircular and arcuate, mounted along the inside of each said first side and said second side of said frame;
    d. a supporting cradle pivotally disposed beneath the platform, pivotal substantially about said slot axis, in two directions substantially from the vertical, said cradle having a first side and a second side corresponding to said first side and said second side of said frame respectively;
    e. a radial alignment guide assembly mounted on the inside of each said first side and said second side of said frame, for slidably engaging said cradle and said frame, the guide assembly allowing radial and rotational variation of the cradle's position substantially relative to said saw slot axis;
    f. a saw assembly pivotally mounted on said supporting cradle, comprising a saw motor to which a circular saw blade is attached, wherein said saw assembly is pivotal in a path that permits the saw blade to be projected upward through and retracted downward from said saw slot, between a maximum exposure position and a recessed position respectively, further, the tilt angle of the saw blade equals the pivot angle of the cradle;
    g. a bevel pinion gear mounted on each of said first side and said second side of the cradle, each said bevel pinion gear fixedly attached to a bevel adjustment through shaft, the adjustment shaft being rotatably attached to the cradle, parallel to the saw slot axis, and manually rotatable, each said pinion gear in secured, gravitationally biased, meshing engagement with the top of the corresponding rack gear, wherein the pinion gears and the rack gears coordinate with said radial alignment guide assemblies to support said cradle, control radial movement of said cradle with respect to said slot axis, and provide a cradle pivot assembly for tilting of the saw blade, with tilt adjustment being accomplished by manually rotating the pinion gears;
    h. maximum exposure adjustment means, whereby the maximum exposure of said circular saw blade above said working surface is automatically adjusted, wherein said maximum exposure adjustment means comprises said bevel pinion gears riding on said support rack gears, further, the design determined contours of the rack gears, automatically vary the slidable radial dimension of the path of the cradle with respect to said slot axis according to the bevel angle, automatically avoiding contact of said saw assembly with said underside of the platform at extreme bevel angles.

2. A double bevel table and slide miter saw comprising:
    a. a generally horizontally disposed platform having a working surface, an underside, a saw slot, a saw slot axis, and a first side and a second side of the platform at opposite ends of the slot;

b. a frame supporting the platform, having a first side and a second side corresponding to said first side and said second side of the platform;

c. a support rack gear, being noncircular and arcuate, mounted along the inside of each said first side and said second side of said frame;

d. a supporting cradle pivotally disposed beneath the platform, pivotal substantially about said saw slot axis and in two directions substantially from the vertical, said cradle having a first side and a second side corresponding to said first side and said second side of said frame respectively;

e. a radial alignment guide assembly mounted on the inside of each said first side and said second side of said frame, slidably engaging the cradle with said frame, the guide assembly allowing radial and rotational variation of the cradle's position substantially relative to said saw slot axis;

f. a motor support carriage slidably mounted on the cradle, slidable on a path parallel to said saw slot axis;

g. a saw assembly pivotally mounted on the carriage, comprising a saw motor to which a circular saw blade is attached, wherein said saw assembly is pivotable in a path that permits the saw blade to be projected upward through and retracted downward from said saw slot, to its maximum exposure position and to its recessed position respectively, the upward projection being performed as the saw blade progresses through an arc producing motion away from said first side and upward, further, the tilt angle of the saw blade equals the pivot angle of the cradle;

h. a bevel pinion gear mounted on each of said first side and said second side of the cradle, each said bevel pinion gear fixedly attached to a bevel adjustment through shaft, the shaft being rotatably attached to the cradle, parallel to the saw slot axis, and manually rotatable, each said bevel pinion gear in secured, gravitationally biased, meshing engagement with the top of the corresponding rack gear, wherein the pinion gears and the rack gears coordinate with said radial alignment guide assemblies to support the cradle, control movement of the cradle with respect to said slot axis, and provide a cradle pivot assembly for tilting of the saw blade, with tilt adjustment being accomplished by manually rotating the pinion gears from either said first side or said second side of said frame;

i. a handle arm on said first side of said frame, pivotally connected to said carriage, for both rotating and moving horizontally said saw assembly;

j. a miter mode control handle attached to the distal end of said handle arm, whereby, upward, downward, forward, and backward movements of the saw blade are executed by the downward, upward, forward, and backward movements respectively of the control handle, the upward projection being performed as the saw blade progresses through an arc producing a motion away from said first side and upward;

k. cutting means, whereby significantly greater slide cutting capacity is provided than for equal slide distances in the known slide miter prior art, wherein the greater cutting capacity includes the full area under a maximum cutting envelope and above said working surface, and wherein said maximum cutting envelope starts as the activated saw blade penetrates the plane of said working surface and continues, through the slidable extent of said saw assembly, at maximum exposure of the saw blade;

l. maximum exposure adjustment means, whereby the maximum exposure of said circular saw blade above said working surface is automatically adjusted, wherein said maximum exposure adjustment means comprises said bevel pinion gears riding on said support rack gears, further, the design determined contours of the rack gears, automatically vary the slidable radial dimension of the path of the cradle with respect to said saw slot axis according to the bevel angle, avoiding contact of said saw assembly with said underside of the platform at extreme bevel cutting angles.

3. A saw as claimed in claim 2, wherein cuttings executed with said miter mode control handle, are directed from said first side to said second side of said platform.

4. A saw as claimed in claim 3, further comprising bevel locking of said supporting cradle to said frame, wherein clamping at two points, one at each said first side and at said second side of said frame, occurs simultaneously, with releasable locking being controlled from either said first side or said second side of said frame.

5. A saw as claimed in claim 4, further including saw blade positioning means, whereby the positioning and locking of the saw blade with respect to said working surface are executed independently of said handle arm, with this positioning and locking being manually controlled from said second side of said frame.

6. A table slide miter saw comprising:

a. a generally horizontally disposed platform having a working surface, a saw slot, a saw slot axis, and a first side and a second side of said platform at opposite ends of said slot;

b. a frame supporting said platform, having a first side and a second side corresponding to said first side and said second side of said platform;

c. a supporting cradle pivotally disposed beneath said platform, pivotal substantially about said saw slot axis, and in two directions substantially from the vertical, the cradle having a first side and a second side corresponding to said first side and said second side of said frame respectively;

d. a motor support carnage slidably mounted on the cradle, slidable on a path parallel to said saw slot axis;

e. a saw assembly pivotally mounted on the carriage, comprising a saw motor to which a circular saw blade is attached, wherein said saw assembly is pivotal in a path that permits the saw blade to be projected upward through and retracted downward from said saw slot, between a maximum exposure position and a recessed position respectively, the upward projection being performed as the saw blade progresses through an arc producing motion away from said first side and upward;

f. a handle arm on said first side of said frame, pivotally connected to said carnage, for both rotating and moving horizontally said saw assembly;

g. a miter mode control handle attached to the distal end of said handle arm, whereby, upward, downward, forward, and backward movements of the saw blade are executed by the downward, upward, forward, and backward movements respectively of the control handle, the upward projection being performed as the saw blade progresses through an arc producing a motion away from said first side and upward;

h. cutting means, whereby significantly greater slide cutting capacity is provided than for equal slide distances in the known slide miter prior art, wherein the greater cutting capacity includes the full area under a maximum cutting envelope and above said working surface, and wherein said maximum cutting envelope starts as the activated saw blade penetrates the plane of said working surface and continues, through the slidable extent of said saw assembly, at maximum exposure of the saw blade.

7. A saw as claimed in claim 6, wherein cuttings executed with said miter mode control handle, are directed from said first side to said second side of said platform.

* * * * *